Patented Feb. 9, 1932

1,844,769

UNITED STATES PATENT OFFICE

SAMUEL ISERMANN, OF SUMMIT, AND HANS J. KALSCHEUER, OF EAST ORANGE, NEW JERSEY

PROCESS OF TANNING

No Drawing. Application filed April 29, 1930. Serial No. 448,415.

Our present invention relates to improvements in the tanning of skins of various kinds including those of reptiles. More particularly it relates to improvements in the soaking and liming steps or so-called beamhouse operations. The function of these steps is to open up the pores of the skin, to remove the fat cells and allow the alkaline solution to reach the gelatinous layer which holds the hair or scales firmly to the hide substances. The treating solution must both dissolve the fat substance and the gelatinous layer. Heretofore these operations have involved soaking the skins first in water and then in a saturated solution of lime, and have required a period of time usually from seven to fourteen days. After this period, the skins are ready for dehairing or descaling as the case may be. These prolonged periods of soaking and liming have certain disadvantages, chief of which is the opportunity afforded for destructive bacterial action. In the case of reptile skins, moreover, the action of the prolonged soaking and liming results in impairing the natural color of the skins whereby a black and white skin loses its contrast so that the result is a skin of inferior quality.

According to our present invention, we avoid these drawbacks by providing for a very much reduced time of soaking and liming. We accomplish this by the use of a special penetrating and fat dissolving agent whose action greatly cuts down the time required for both soaking and liming steps whereby the adverse bacterial action is reduced to a minimum. The agent or agents comprise the alkylated aromatic sulphonic acids and their salts. These substances per se are not of our invention and may be obtained in the open market. These agents are distinguished from the sulphonic acid derivatives of the lower homologues of phenol by the fact that they are of colloidal nature and have the physical characteristics of soaps both as free acids and in the form of salts, and it is because of these characteristics that their suitability as penetrating and fat dissolving agents depends. They differ from soaps, however, in forming soluble lime salts and this property is of particular value in the present invention as will be hereinafter apparent. They may be defined more precisely as the sulphonic acids derived from the aromatic hydrocarbons (for instance, naphthalene) containing as a substituent the isopropyl group or other aliphatic groups containing at least 3 carbon atoms. Especially effective for the purpose of the present invention are, among others, the isopropyl naphthalene sulphonic acids as well as salts thereof.

In order that our invention may be fully understood, we give the following illustrative example thereof, details of which will be varied for different conditions as will be readily understood by those skilled in the art. The example given is for treating lizard skins, to which the invention is applied with a high degree of success, but it will be understood that the invention is equally applicable to skins of hairy animals as well.

The lizard skins are soaked in a solution containing the penetrating agent as described above in an amount which may vary from $\frac{1}{10}$% to 3%, based on the weight of the raw skins, but preferably not more than 1% of the solution by liquid measure. The solution also has added thereto sodium carbonate, $Na_2CO_3$, in the approximate amount of 2½% based on the weight of the skins. The latter are soaked in the solution until they have the same "feel" as in the ordinary processes, such period requiring approximately 12 hours. The skins which are now substantially fat-free are then transferred into a solution containing the penetrating agent in an amount equal preferably to 3% by weight of the skins to which solution is added 2½% sodium carbonate and 5% lime. The skins are treated in this bath for a period varying usually from 18 to 24 hours. After this period, the scales may be freely removed by the usual means. The temperature of the bath is preferably from 60 to 70° F. The skins are then well washed in water which is changed three or four times, the temperature of each wash being increased until a maximum of 90° F. is reached. The skins are then left in a water soaking solution several hours. They are then ready for the bating, pickling, and tanning operations. The pickle is prepared in the usual way, preferably with the addition of a small amount of the penetrating agent for the purpose of keeping the pores of the skin fully open to insure thereby complete removal of the alkali contained therein.

Since the use of the penetrating agent greatly cuts down the time of the soaking and liming operations, much less chance is given for adverse bacterial action to develop. Because of the short time of treatment, the hair recovered from the skins is of superior quality and is adapted to various commercial uses. Our process is particularly applicable to skins containing relatively large amounts of fat as, for example, sealskin.

In the claims we refer to both the dehairing and descaling of skins by the generic expression "removal of epidermal appendages".

We claim:

1. In the removal of epidermal appendages from animal skins preparatory to the tanning operation, the step which consists in removing the fat from the skins by subjecting them to the action of alkylated aromatic sulphonic compounds.

2. In the removal of epidermal appendages from animal skins preparatory to the tanning operation, the step which consists in removing fat from said skins by subjecting them to the action of alkylated aromatic sulphonic compounds under alkaline conditions.

3. In the removal of epidermal appendages from animal skins preparatory to the tanning operation, the steps which consist in subjecting the skins to the action of alkylated aromatic sulphonic compounds in the presence of an alkaline carbonate, then subjecting them to the action of alkylated aromatic sulphonic acids in the presence of calcium hydroxide.

4. In the removal of epidermal appendages from animal skins preparatory to the tanning operation, the step which consists in removing the fat from the skins by subjecting them to the action of aromatic sulphonic compounds containing an aliphatic substituent group comprising at least three carbon atoms.

5. In the removal of epidermal appendages from animal skins preparatory to the tanning operation, the step which consists in removing the fat from the skins by subjecting them to the action of isopropyl naphthalene sulphonic compounds.

In testimony whereof we have affixed our signatures to this specification.

SAMUEL ISERMANN.
HANS J. KALSCHEUER.